United States Patent [19]

Loefke et al.

[11] Patent Number: 5,056,641

[45] Date of Patent: Oct. 15, 1991

[54] EXTENSION CHUTE AND CONNECTION THEREFOR

[75] Inventors: William L. Loefke; Ronald E. Christenson, both of Kasson; Garwin B. McNeilus, Dodge Center, all of Minn.

[73] Assignee: McNeilus Truck and Manufacturing, Inc., Dodge City, Minn.

[21] Appl. No.: 470,915

[22] Filed: Jan. 26, 1990

[51] Int. Cl.[5] .............................................. B65G 11/00

[52] U.S. Cl. ................................. 193/2 R; 193/25 A; 193/2 A

[58] Field of Search ....................... 193/2 R, 2 A, 4-6, 193/25 C, 25 A

[56] References Cited

U.S. PATENT DOCUMENTS

| | | | |
|---|---|---|---|
| 1,031,829 | 7/1912 | Adams | 193/6 |
| 1,033,492 | 7/1912 | Thompson | 193/6 |
| 1,430,197 | 9/1922 | Sonday | 193/6 X |
| 1,724,548 | 8/1929 | Barcus | 193/6 |
| 2,968,382 | 1/1961 | Oury | 193/6 |
| 4,007,821 | 2/1977 | Schiffelbein | 193/4 |
| 4,054,194 | 10/1977 | Davis | 193/2 R X |
| 4,198,043 | 4/1980 | Timbes et al. | 193/2 R X |

FOREIGN PATENT DOCUMENTS

| | | | |
|---|---|---|---|
| 909810 | 5/1946 | France | 193/2 R |
| 2424201 | 12/1979 | France | 193/2 R |

*Primary Examiner*—D. Glenn Dayoan

*Attorney, Agent, or Firm*—Merchant, Gould, Smith, Edell, Welter & Schmidt

[57] ABSTRACT

An improved discharge chute assembly for use with a concrete mixing truck includes improved chute components which are fabricated from a high strength, lightweight polymeric material. The polymeric material tends to remain smooth during wear, and permits chutes according to the invention to be manufactured much lighter than those heretofore known. According to a second aspect of the invention, an improved connecting joint structure is provided which is simple to connect and disconnect, and will not become jammed with wet concrete. Both the chute components and joint structure are constructed with smooth outer surfaces to avoid catching on clothing or other fabric. The combination of lightweight chute components and the improved joint structure yields a discharge chute assembly which is safer and more efficient to deploy at a construction site.

17 Claims, 5 Drawing Sheets

EXTENSION CHUTE AND CONNECTION THEREFOR

FIELD OF THE INVENTION

1. Field of the Invention

This invention relates to mobile systems for mixing and dispensing concrete. More specifically, this invention relates to an improved chute structure for guiding concrete from a discharge end of a concrete mixer truck to a desired location.

2. Description of the Prior Art

Concrete mixing trucks such as those manufactured by the assignee of this invention, McNeilus Truck and Manufacturing Corporation of Dodge Center, Minn., are widely used in the construction industry for preparing and transporting a concrete mixture to a desired construction site.

In order to guide concrete into a set of forms or equivalent molding structure, most mixing trucks in commercial use today include a pivotable main discharge chute, a second chute which folds out from the main chute, and, optionally, additional extension chutes which connect to the foldout chute.

In order to withstand stresses which are created by the flux of wet concrete, discharge chute components need to possess a great deal of strength and wear resistance. At present, manufacturers have relied upon thick gauge sheet metal to construct chute components with the necessary strength and wear characteristics. Metal chute components have proven effective in guiding concrete. However, their weight makes the chute assembly difficult to reposition during use.

Another disadvantage with metal discharge chute components is their tendency to oxidize or otherwise corrode after prolonged use. This type of degradation, in conjunction with normal abrasive wear, can cause the guide surfaces of chute components to become roughened, thereby impairing their efficiency for guiding and making it more difficult to clean the guide surfaces after use.

Another problem which is present in existing discharge chute assemblies involves the connections which are used to join extension chutes to each other and to upstream chutes. Most existing systems use a simple hookloop type connection to make such a connection. Such connections, however, tend to become jammed with wet concrete, which eventually hardens. In addition, clothing can be caught on the sharp hooks and other edges of such joints. Furthermore, prior art joints are often difficult to fasten and release, particularly by a single person.

It is clear that there has existed a long and unfilled need in the art for a discharge chute component which is lighter in weight and is less susceptible to roughening of its guide surfaces than chute components heretofore known.

SUMMARY OF THE INVENTION

It is further an object of this invention to provide a joint structure for a discharge chute assembly which is safe to use and which will not become jammed with concrete during operation.

In order to achieve these and other objects of the invention, a discharge chute according to the invention may be of the type which is adapted for guiding a concrete mixture from a discharge end of a concrete mixer truck to a desired location, and may include an elongate chute wall having a concave inner guide surface and a convex outer surface; structure connected to the chute wall for reinforcing the chute wall against bending in the longitudinal direction; and structure adapted for joining an upstream end of the chute wall to an ancillary guide structure for receiving a concrete mixture; the chute wall being fabricated from a high strength, lightweight polymeric material which tends to remain smooth during wear, whereby the discharge chute is more efficient and less cumbersome to operate than chutes heretofore known.

According to a second aspect of the invention, a discharge chute assembly according to the invention may include a first chute having an upstream end which is adapted for connection to an ancillary guide structure, and a downstream end; a second chute having an upstream end and a downstream end which is adapted for connection to downstream chute structure; and structure for releasably joining the first chute to the second chute, the joining structure being releasable by raising the downstream end of the second chute with respect to the upstream end of the second chute while the first chute remains stationary, whereby the second chute may be removed with minimal exertion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
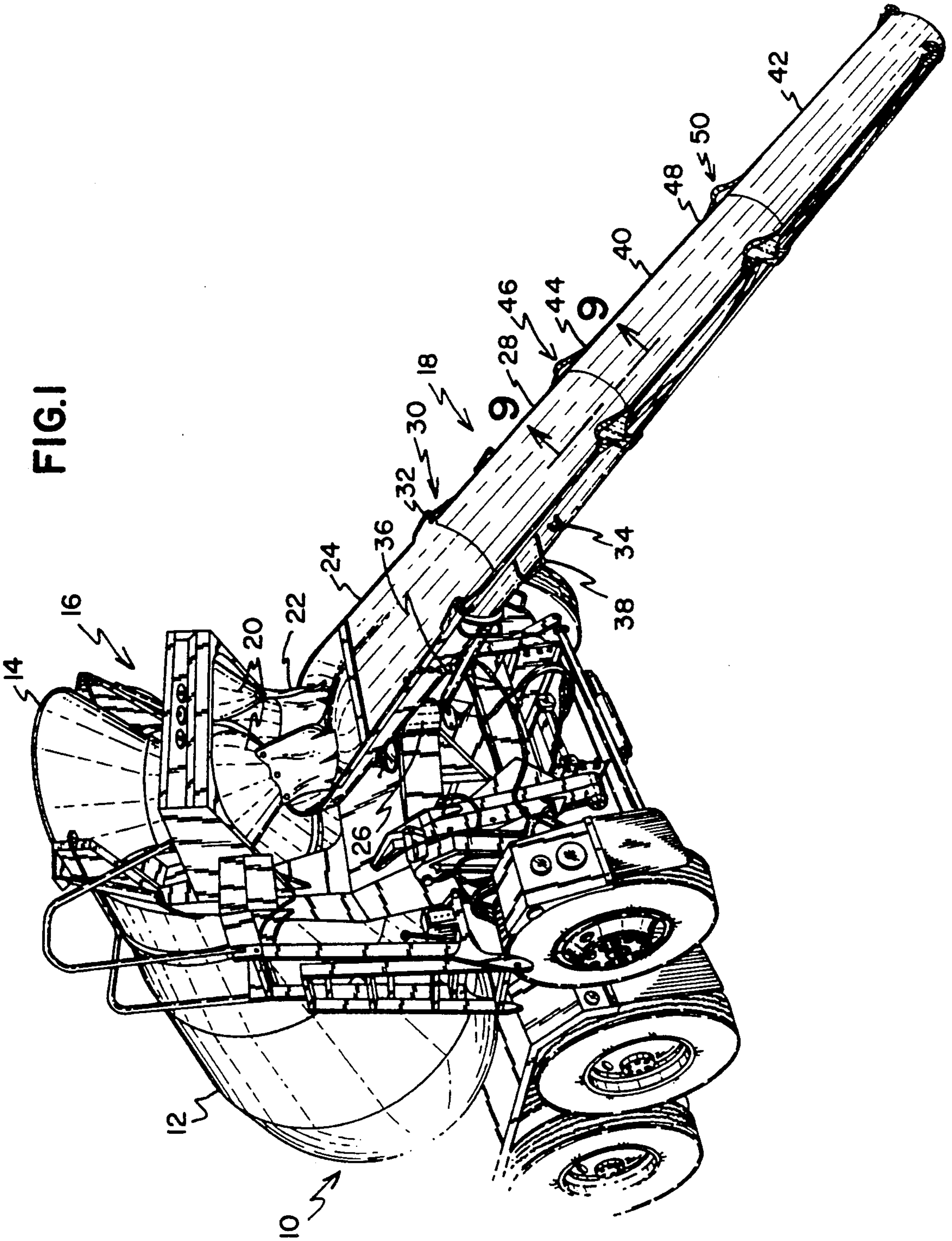
FIG. 1 is a perspective view of a mobile concrete mixing and delivery system according to a first preferred embodiment of the invention.

Referring now to the drawings, wherein like reference numerals designate corresponding structure throughout the views, and referring in particular to FIG. 1, a mixing truck 10 includes a mixing drum 12 for mixing and dispensing concrete, a fill chute funnel 14 for charging the mixing drum 12, and a discharge mechanism 16 for guiding concrete mixture into a discharge chute assembly 18. The discharge mechanism 16 includes a pair of discharge funnel guides 20 and a flexible guide curtain 22 for guiding concrete mixture into a main discharge chute 24. In a manner that is common in the art, main discharge chute 24 is adjustably mounted with respect to a chassis of mixing truck 10 by a pivot mechanism 26. As a result, main discharge chute 24 may be pivoted toward a set of forms or other location where concrete mix is to be applied.

As is additionally shown in FIG. 1, a second, fold-over chute 28 is mounted to a downstream end of main discharge chute 24 by a hinge type joint 30. Hinge type joint 30 is of standard construction and includes a set of pivot pins 32 about which fold-over chute 28 may pivot with respect to the body of main discharge chute 24. When fold-over chute 28 is in its operative position, as is illustrated in FIG. 1, its longitudinal axis is substantially coincident with a longitudinal axis of main discharge chute 24. During periods of non-use such as when mixing truck 10 is in motion, the main body of fold-over chute 28 may be pivoted to a position over main discharge chute 24. In this latter position, fold-over chute 28 may be held in place by means of a retaining hook 36, which engages a bracket 34 on fold-over chute 28. A pair of handles 38 are molded into a side surface of fold-over chute 28 for pivoting discharge chute assembly 18 about the axis provided by pivot mechanism 26.

Looking again to FIG. 1, discharge chute assembly 18 further includes a first extension chute 40 and at least a second extension chute 42. First extension chute 40 has an upstream end 44 which is releasably joined to a downstream end of foldout chute 28 by a first releasable extension chute connecting joint 46. Second extension chute 42 is joined to a downstream end 48 of first extension chute 40 by a second releasable chute connecting joint 50 which is identical in purpose and construction to first releasable extension chute connecting joint 46. The construction of first and second releasable extension chute connecting joints 46, 50 is an important part of the invention, and will be explained in greater detail hereinbelow.

Figure 2:
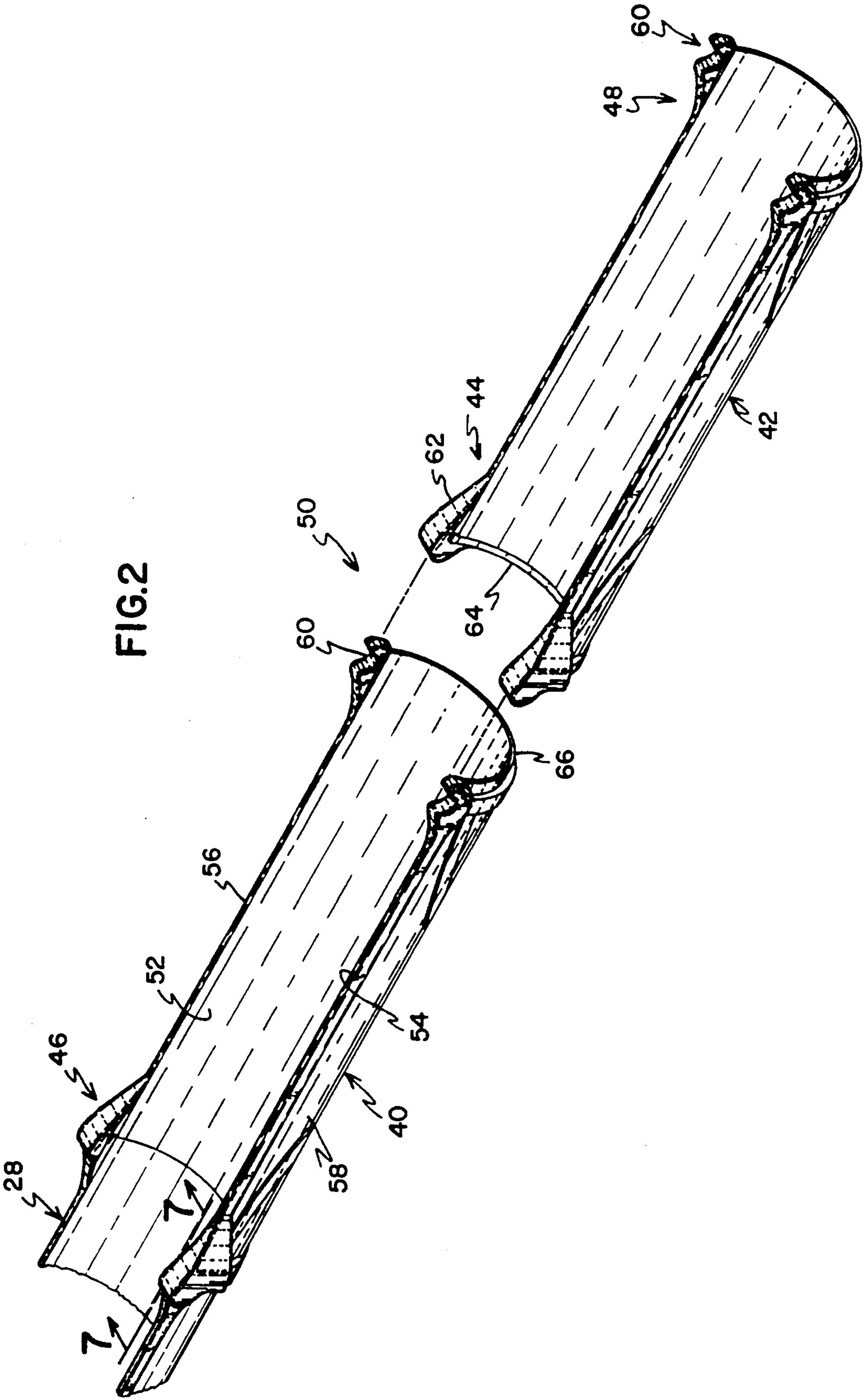
FIG. 2 is a fragmentary exploded perspective view of a chute assembly according to the embodiment of FIG. 1.
Figure 5:
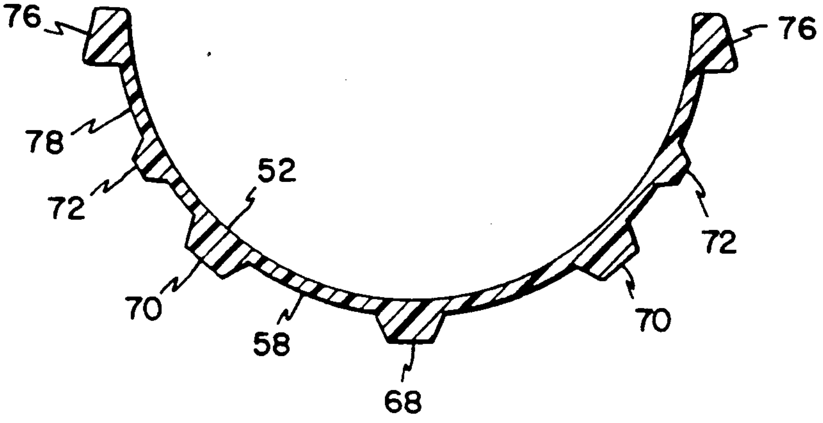
FIG. 5 is a cross sectional view taken along lines 5—5 in FIG. 4.

Referring now to FIGS. 2 and 5, first extension chute 40, which is identical in construction to second chute 42, includes a chute wall 78 which is shaped to define a concave inner guide surface 52 between a first chute rim 54 and a first chute rim 56. Chute wall 78 further defines a convex outer surface 58 which is substantially concentric with the concave inner guide surface 52. Second extension chute 42 is similarly constructed.

As is shown in FIG. 2, a downstream end of first extension chute 40 is provided with a pair of symmetrically constructed cammed joint projections 60 which are constructed so as to be received within a corresponding pair of cammed socket housings 62. The details of construction for the cammed joint projections 60 and cammed socket housings 62 will be discussed in appropriate detail with reference to FIGS. 6 and 7 below. A projecting lip 66 extends from the downstream end of first extension chute 40 and is receivable within an inner lip-receiving recess 64 which is defined in an inner guide surface of the upstream end 44 of second extension chute 42. This allows . the inner guide surface 52 of first extension chute 40 to overlap the corresponding inner guide surface in second extension chute 42 in the region which is proximate connecting joint 50 so as to prevent leakage of concrete mixture from chutes 40, 42 at joint 50.

Figure 3:
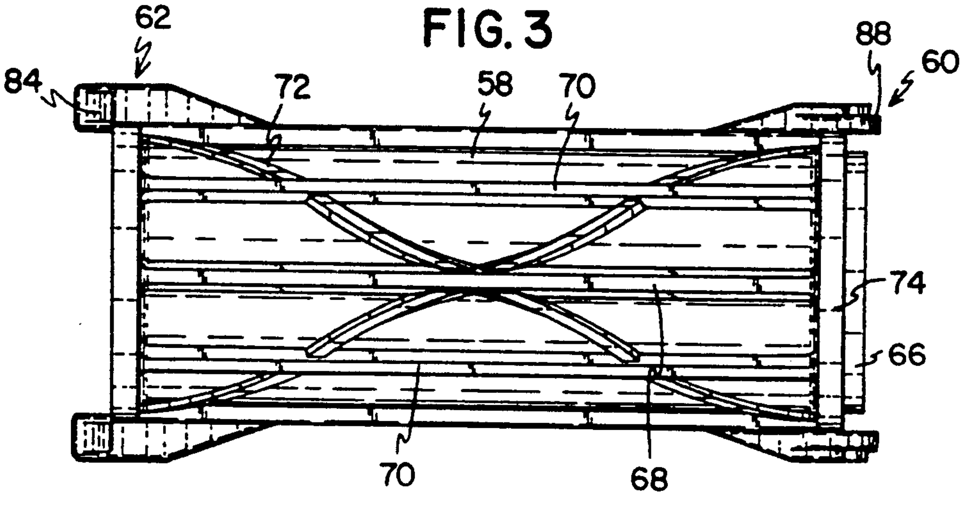
FIG. 3 is a bottom isolational view of a component of the chute assembly that is illustrated in FIGS. 1 and 2.
Figure 4:
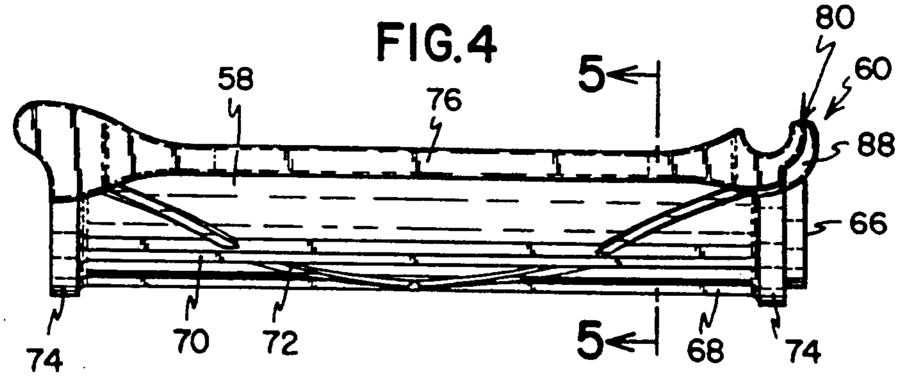
FIG. 4 is a side elevational view of the component depicted in FIG. 3.

Referring now to FIGS. 3–5, the construction of an extension chute 40, 42 will now be discussed. In order to reinforce chute wall 78 against bending in the longitudinal direction, a longitudinal center stiffening rib 68 is provided along a longitudinal axis along the outer surface 58 of chute wall 78. In addition, a pair of longitudinal side stiffening ribs 70 are provided on each side of center stiffening rib 68 on a side portion of convex outer surface 58. Both the longitudinal center stiffening rib 68 and the longitudinal side stiffening ribs 70 are unitary with and fabricated of the same material as chute wall 78. In order to reinforce chute wall 78 against torsional forces which might result from twisting one of the chutes 40, 42, four diagonal cross bracing ribs 72 are provided, as is best shown in FIG. 3. Each of the cross bracing ribs 72 are unitary with the convex outer surface 58 of chute wall 78 and extends from a mid-point of the longitudinal center stiffening rib 68 to a thickened top edging portion of the chute 40, 42 which defines the first and second chute rims 54, 56. Each chute 40, 42 is further provided with a thickened end edging portion 74 which is constructed to withstand the compressive forces which are created at the joints 46, 50.

Figure 6:
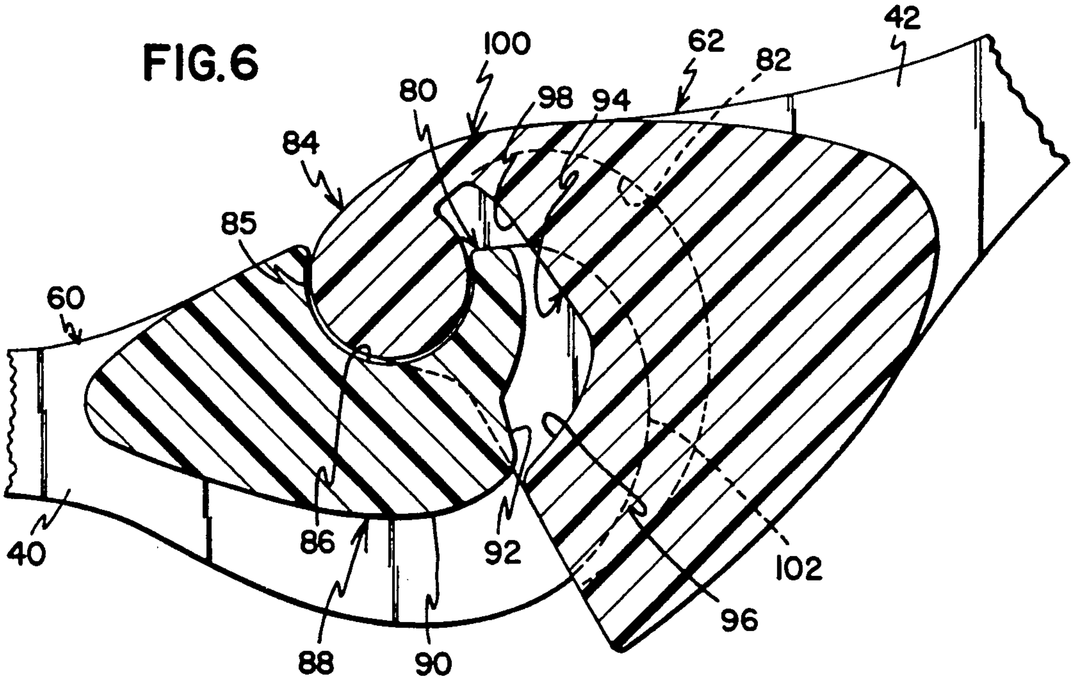
FIG. 6 is a first diagrammatical cross-sectional view taken along lines 7—7 in FIG. 2 illustrating a releasable extension chute connecting joint according to the embodiment of FIGS. 1-5 in a first, released position.
Figure 7:
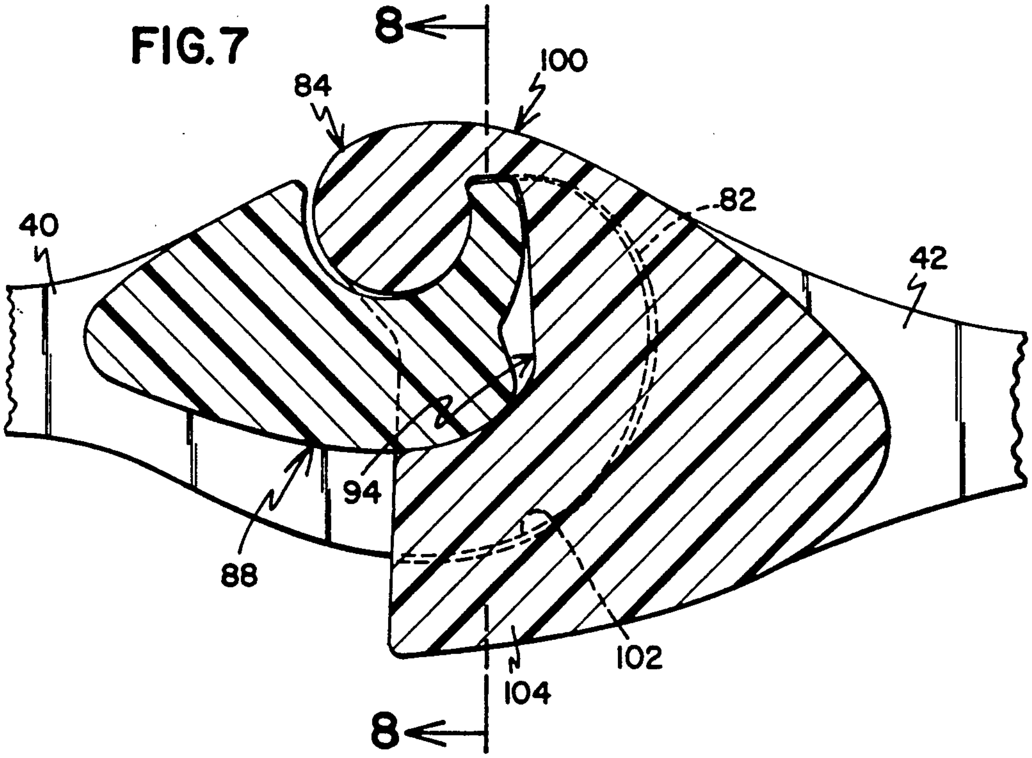
FIG. 7 is a diagrammatical cross-sectional view similar to FIG. 6, with the releasable extension chute connecting joint depicted in a second, locked position.
Figure 8:
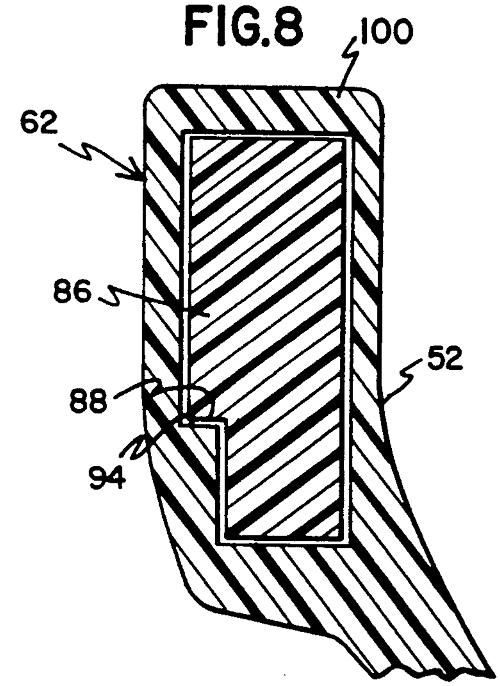
FIG. 8 is a cross-sectional view taken along lines 8—8 in FIG. 7.
Figure 9:
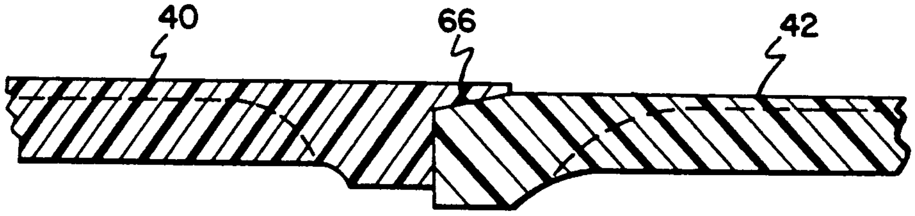
FIG. 9 is a cross-sectional view taken along lines 9—9 in FIG. 1.

Looking now to FIGS. 6 and 7, cammed joint projection 60 includes a hook member 80 which is also visible in FIG. 4. As may be seen in FIGS. 6 and 7, hook member 80 is receivable within a complementary hook-receiving recess which is defined in cammed socket housing 62 by a surface 82. Cammed socket housing 62 further includes a pin portion 84 which has a convex, downwardly facing engagement surface 85. As may be seen in FIGS. 6 and 7, the engagement surface 85 of pin portion 84 is configured so as to be tightly receivable within a socket which is defined in cammed joint projection 60 by a surface 86.

As may be seen in FIGS. 4, 6 or 7, a projecting cam structure on cammed joint projection 60 defines a first cam surface 88 having a first section 90 and a second section 92. A second cammed surface 94 is defined by cammed socket housing 62. Second cammed surface 94 includes a first section 96 and a second section 98. The first and second cammed surfaces 88, 94 are shaped so that the respective first can sections 90, 96 will engage when the joint 50 is in the locked position.

It should be understood that the structure of first releasable extension chute connecting joint 46 is identical to the structure which is described above with reference to joint 50.

According to one important aspect of the invention, main chute 24, fold-over chute 28, the first and second extension chutes 40, 42 and the respective connecting joints 46, 50 are fabricated from a high strength, lightweight polymeric material. The use of any polymer which has a relatively low frictional coefficient and which tends to remain smooth as it wears is within the scope of the invention. However, polymeric materials having a high strength to weight ratio are preferred. Cross linked and fiber reinforced polymeric materials are preferable for this reason. The polymer preferably has a base of polyurethane or nylon. At the time of application for patent the most preferred material is Uniroyal 3105 polyurethane, which is available from Uniroyal Chemical Co. An alternative material is a polyurethane marketed as Chempol 300-400 by Freeman Chemical Co.

Since the polymeric material is stronger and more durable than steel based on a given weight of material, a chute according to the invention can be made lighter in weight and yet have equivalent strength to metallic chutes which are in use today.

In operation, mixing truck 10 is positioned adjacent a set of forms or other concrete molds. Fold-over chute 28 is unlimbered and extended to its operative position. Handles 38 are used to pivot fold-out chute 28 toward the forms or molds. At this time, an operator positions the upstream end 44 of first extension chute adjacent the cammed joint projections 60 of fold-over chute 28. The cammed socket housing 62 of first extension chute 40 are kept adjacent the cammed joint projections 60 of fold-over chute 28 while the downstream end of first extension chute 40 is lifted with respect to the upstream end of first extension chute 40. As is shown in FIG. 6, the pin portion 84 of each of the cammed socket housings 62 is inserted in the corresponding pin-receiving socket defined by surfaces 86 in the cammed joint projections 60. At the same time, the convex outer surface 102 of cammed joint projection 60 is inserted into the hook-receiving recess which is defined by a surface 82. At this time, the downstream end of first extension chute 40 may be lowered. As this happens, the first cam surface 88 engages the second cam surface 94, thereby locking the cammed joint projection 60 into the cammed socket housing 62, as is shown in FIG. 7. As a result, the first extension chute 40 will be securely attached to fold-over chute 28 until it is removed. Second extension chute 42 and subsequent chutes may be connected to the downstream end of first extension chute 40 in a manner which is identical to that described above.

When it is desired to remove first extension chute 40 from fold-over chute 28, the downstream end of first extension chute 40 is lifted with respect to the first releasable extension chute connecting joint 46. This unlocks first cam section 90 from the respective first cam section 96 and permits removal of the cammed joint projection 60 from socket housing 62 in a sequence which is opposite from that described above with reference to the connection procedure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A discharge chute of the type which is adapted for guiding a concrete mixture from a discharge end of a concrete mixer truck to a desired location, comprising:

an elongate chute wall having a concave inner guide surface and a convex outer surface;

means connected to said chute wall for reinforcing said chute wall against bending in the longitudinal direction; and means adapted for joining an upstream end of said chute wall to an ancillary guide structure for receiving a concrete mixture; said reinforcing means and said chute wall being fabricated from a high strength, lightweight polymeric material which tends to remain smooth during wear.

2. A discharge chute according to claim 1, wherein said material is selected from a group comprising nylons and polyurethanes.

3. A discharge chute according to claim 1, wherein said material comprises a cross-linked polymer.

4. A discharge chute according to claim 1, wherein said material comprises a fiber-reinforced polymer.

5. A discharge chute according to claim 1, wherein said material has relatively low frictional characteristics, thereby increasing the efficiency of said chute.

6. A discharge chute according to claim 1, wherein said longitudinal stiffening means comprises a longitudinal rib, said rib being integral with said convex outer surface of said chute wall.

7. A discharge chute according to claim 6, wherein said rib is unitary with and fabricated of the same material as said chute wall.

8. A discharge chute according to claim 6, wherein said rib is located along a central axis along the outer surface of said chute wall.

9. A discharge chute according to claim 1, further comprising means for reinforcing said chute wall against torsional forces.

10. A discharge chute according to claim 9, wherein said torsional reinforcing means comprises a diagonal cross-bracing rib which is integral with said convex outer surface of said chute wall.

11. A chute according to claim 1, wherein said chute wall, said reinforcing means and said joining means all have relatively smooth outer surfaces, whereby clothing will not be torn or caught during operation.

12. A chute according to claim 1, wherein said joining means comprises a hinge-type connection, and said chute is a fold-over chute.

13. A chute according to claim 1, wherein said chute is an extension chute, and further comprising second means adapted for joining a downstream end of said chute wall to a second extension chute.

14. A chute according to claim 1, wherein said chute is a main chute.

15. A discharge chute assembly for guiding a concrete mixture from an ancillary guide structure to, electively, either a deposit location or downstream chute structure, comprising:

a first chute having an upstream end which is adapted for connection to an ancillary guide structure, and a downstream end;

a second chute having an upstream end and a downstream end which is adapted for connection to downstream chute structure; and means for releasably joining said first chute to said second chute, said releasable joining means comprising a projection member connected to one of said first and said second chutes, a socket housing on the other of said first and second chutes having a recess defined therein for receiving said projection member, and cam means for locking said projection within said socket housing when said first and said second chutes are in an operative position, said socket housing including a pin portion, and said projection member having a socket defined therein for receiving said pin portion, and wherein said cam means comprises means for locking said pin portion into said socket when said first and second chutes are in the operative position, so that said joining means is releasable by raising said downstream end of said second chute with respect to said upstream end of said second chute while said first chute remains stationary.

16. A discharge chute assembly according to claim 15, wherein said joining means is constructed without sharp projections or edges on which apparel may become caught.

17. A discharge chute according to claim 15, wherein said cam means comprises a first cam surface on said projection member and a second cam surface on said socket housing.

* * * * *

UNITED STATES PATENT AND TRADEMARK OFFICE
CERTIFICATE OF CORRECTION

PATENT NO. : 5,056,641

DATED : October 15, 1991

INVENTOR(S) : Loefke et al.

It is certified that error appears in the above-identified patent and that said Letters Patent is hereby corrected as shown below:

In column 1, line 5, please delete "FIELD OF THE INVENTION" and substitute therefore--BACKGROUND OF THE INVENTION--.

In column 2, line 48, please delete "cross sectional" and substitute therefore--cross-sectional--.

In column 3, line 65, please delete "." after the word "allows".

In column 4, line 46, please delete "can" and substitute therefore--cam--.

Signed and Sealed this

Thirteenth Day of April, 1993

*Attest:*

STEPHEN G. KUNIN

*Attesting Officer*

*Acting Commissioner of Patents and Trademarks*